United States Patent
Park et al.

(10) Patent No.: US 8,405,635 B2
(45) Date of Patent: Mar. 26, 2013

(54) TOUCH SCREEN PANEL AND FABRICATING METHOD THEREOF

(75) Inventors: Jung-Mok Park, Yongin (KR); Do-Ok Park, Yongin (KR); Sun-Haeng Cho, Yongin (KR); Sung-Ku Kang, Yongin (KR); Byeong-Kyu Jeon, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 260 days.

(21) Appl. No.: 12/975,549

(22) Filed: Dec. 22, 2010

(65) Prior Publication Data

US 2012/0038595 A1 Feb. 16, 2012

(30) Foreign Application Priority Data

Aug. 11, 2010 (KR) ........................ 10-2010-0077313

(51) Int. Cl.
*G06G 3/045* (2006.01)
(52) U.S. Cl. ..................................... 345/174; 178/18.06
(58) Field of Classification Search .......... 345/173–183; 178/18.01–18.08
See application file for complete search history.

(56) References Cited

U.S. PATENT DOCUMENTS

| 2010/0171718 A1* | 7/2010 | Denda ........................... 345/173 |
| 2010/0182253 A1* | 7/2010 | Park et al. ..................... 345/173 |
| 2010/0182259 A1* | 7/2010 | Jung et al. ..................... 345/173 |
| 2010/0182274 A1* | 7/2010 | Kang et al. .................... 345/174 |
| 2011/0005662 A1* | 1/2011 | Sung ............................. 156/153 |

FOREIGN PATENT DOCUMENTS

KR 10-2009-0068164 6/2009

\* cited by examiner

*Primary Examiner* — Hong Zhou
(74) *Attorney, Agent, or Firm* — Christie, Parker & Hale, LLP (57) ABSTRACT

A touch screen panel includes a transparent substrate; first detection cells and second detection cells alternately disposed on an active touch area of one surface of the transparent substrate in such a manner that the first detection cells are connected to each other along a first direction and second detection cells are connected to each other along a second direction; a driving/shield electrode formed throughout the other surface of the transparent substrate in such a manner that ends of the driving/shield electrode are located at an inner side of the transparent substrate while being spaced apart from a boundary line of the transparent substrate by a predetermined interval; and a first insulation layer formed throughout the other surface of the transparent substrate, on which the driving/shield electrode is formed, to cover an exposed surface of the driving/shield electrode, inclusive of sides of the driving/shield electrode.

9 Claims, 7 Drawing Sheets

TOUCH SCREEN PANEL AND FABRICATING METHOD THEREOF

CROSS-REFERENCE TO RELATED APPLICATION

This application claims priority to and the benefit of Korean Patent Application No. 10-2010-0077313, filed on Aug. 11, 2010 in the Korean Intellectual Property Office, the entire disclosure of which is incorporated herein by reference.

BACKGROUND

1. Field

Aspects of the present invention relate to a touch screen panel and a fabricating method thereof, and more particularly, relate to a touch screen panel capable of ensuring the stability of a driving/shield electrode formed at one surface of the touch screen panel, and a fabricating method thereof.

2. Description of the Related Art

A touch screen panel is an input device through which a user's command can be input through a screen of an image display apparatus after instruction contents are displayed on the screen. The input can be the selection of the instruction contents by a finger of a person or an object on the screen. To this end, the touch screen panel is provided on the front surface of the image display apparatus to convert a contact position at which the finger of the person or the object directly makes contact with the touch screen panel into an electrical signal. Thus, the instruction contents selected at the contact position are regarded as an input signal. Such a touch screen panel can replace a separate input device (e.g., a keyboard and a mouse) operating after being connected to the image display apparatus, and therefore the use range of the touch screen panel is gradually expanded.

Known types of touch screen panel include a resistive touch screen panel, a photosensitive touch screen panel, a capacitive touch screen panel and the like. Among these types, the capacitive touch screen panel includes first detection cells formed along a first direction, and second detection cells formed along a second direction. The capacitive touch screen panel detects a point at which the capacitance changes when a finger of a person or an object makes contact with the touch screen panel, to understand a contact position.

In general, such first and second first detection cells are alternately disposed on one surface (e.g., an upper surface) of the touch screen panel. Driving/shield electrodes may be formed on the other surface (e.g., a lower surface) of the touch screen panel. Such a driving/shield electrode may be used as a driving electrode (another driving electrode other than the first and second first detection cells) of the touch screen panel, or may be connected to a constant voltage source such as a ground power source to be used as a shield electrode for ensuring stability between the touch screen panel and a display panel.

The driving/shield electrodes are formed on the other surface facing the surface of the touch screen panel, on which the first and second first detection cells are formed. The driving/shield electrodes may be formed on the whole area including an active touch area, in which the first and second first detection cells are disposed, and an inactive touch area around the active touch area. Thus, the driving/shield electrodes generally are formed as a layer throughout a mother substrate for forming a plurality of touch screen panels, and then are separated from each other by the touch screen panel in a scribing step without passing through a separate patterning process.

In such a case, although a passivation layer for protecting the driving/shield electrodes has been formed on the other surface of the touch screen panel, on which the driving/shield electrodes are formed, cut sides of the driving/shield electrodes are exposed to the outside at the scribing step for dividing each touch screen panel from the mother substrate. Therefore, moisture and the like infiltrates into the exposed sides of the driving/shield electrodes, causes a short-circuit between the driving/shield electrodes and a structure of a set-side (for example, a conductive structure such as a case), resulting in an abnormal operation of the touch screen panel.

SUMMARY

Accordingly, aspects of the present invention have been made to provide a touch screen panel capable of ensuring the stability of a driving/shield electrode formed at one surface of the touch screen panel and a fabricating method thereof.

According to an aspect of the present invention, a touch screen panel includes: a transparent substrate; first detection cells and second detection cells alternately disposed on an active touch area of one surface of the transparent substrate in such a manner that the first detection cells are connected to each other along a first direction and second detection cells are connected to each other along a second direction; a driving/shield electrode formed throughout the other surface of the transparent substrate in such a manner that ends of the driving/shield electrode are located at an inner side of the transparent substrate while being spaced apart from a boundary line of the transparent substrate by a predetermined interval; and a first insulation layer formed throughout the other surface of the transparent substrate, on which the driving/shield electrode is formed, to cover an exposed surface of the driving/shield electrode, inclusive of sides of the driving/shield electrode.

According to an aspect of the invention, the first detection cells and the second detection cells may be formed on an upper surface of the transparent substrate, and the driving/shield electrode and the first insulation layer may be formed on a lower surface of the transparent substrate.

According to an aspect of the invention, the touch screen panel may further include a dummy pattern formed at a peripheral portion of the other surface of the transparent substrate while being spaced apart from the driving/shield electrode, the dummy pattern and the driving/shield electrode being formed of a same material and formed on a same layer.

According to an aspect of the invention, the touch screen panel may further include a second insulation layer which is formed throughout the one surface of the transparent substrate, on which the first detection cells and the second detection cells are formed, to cover the first detection cells and the second detection cells.

According to an aspect of the invention, the first detection cells, the second detection cells, and the driving/shield electrode may be formed of a transparent electrode material.

According to an aspect of the present invention, there is provided a method for fabricating a touch screen panel, includes: preparing a mother substrate for forming a plurality of touch screen panels; forming a plurality of first detection cells and a plurality of second detection cells on respective areas of the touch screen panels of one surface of the mother substrate such that the first detection cells are connected to each other along a first direction and second detection cells are connected to each other along a second direction; patterning driving/shield electrodes throughout respective areas of the touch screen panels of the other surface of the mother substrate such that ends of each driving/shield electrodes are located at inner sides of the respective areas of the touch screen panels while being spaced apart from a scribing line for separating the touch screen panels by a predetermined interval, and driving/shield electrodes among adjacent touch screen panels are separated from each other; forming a first insulation layer throughout the other surface of the transparent substrate to cover an exposed surface of the driving/shield electrodes, inclusive of sides of the driving/shield electrodes; and separating the touch screen panels from each other by cutting the mother substrate along the scribing line.

According to an aspect of the invention, in the patterning of the driving/shield electrodes, a layer may be partially formed on the respective areas of the touch screen panels of the other surface of the mother substrate by using a transparent electrode material through masks.

According to an aspect of the invention, the patterning of the driving/shield electrodes may include: forming a layer throughout the other surface of the mother substrate by using a transparent electrode material; and removing a transparent electrode material located at boundary portions of the respective areas of the touch screen panels through an etching process.

According to an aspect of the invention, the patterning of the driving/shield electrodes may include: forming a layer throughout the other surface of the mother substrate by using a transparent electrode material; and dividing the transparent electrode material formed on the respective areas of the touch screen panels into a driving/shield electrode, which overlaps the first detection cells and the second detection cells, and an outer dummy pattern, which is located around the scribing line while being spaced apart from the driving/shield electrode, through a laser cutting process, a grinding process or a polishing process.

According to aspects of the present invention as described above, the ends of the driving/shield electrode formed throughout one surface of the touch screen panel are located at the inner side of the transparent substrate while being spaced apart from the boundary line by a predetermined interval, and the first insulation layer covers the entire exposed surface of the driving/shield electrode, inclusive of the sides of the driving/shield electrode, so that the stability of the driving/shield electrode can be ensured and the reliability of the touch screen panel can be improved.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION

Reference will now be made in detail to the present embodiments of the present invention, examples of which are illustrated in the accompanying drawings, wherein like reference numerals refer to the like elements throughout. The embodiments are described below in order to explain the present invention by referring to the figures. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween.

Figure 1:
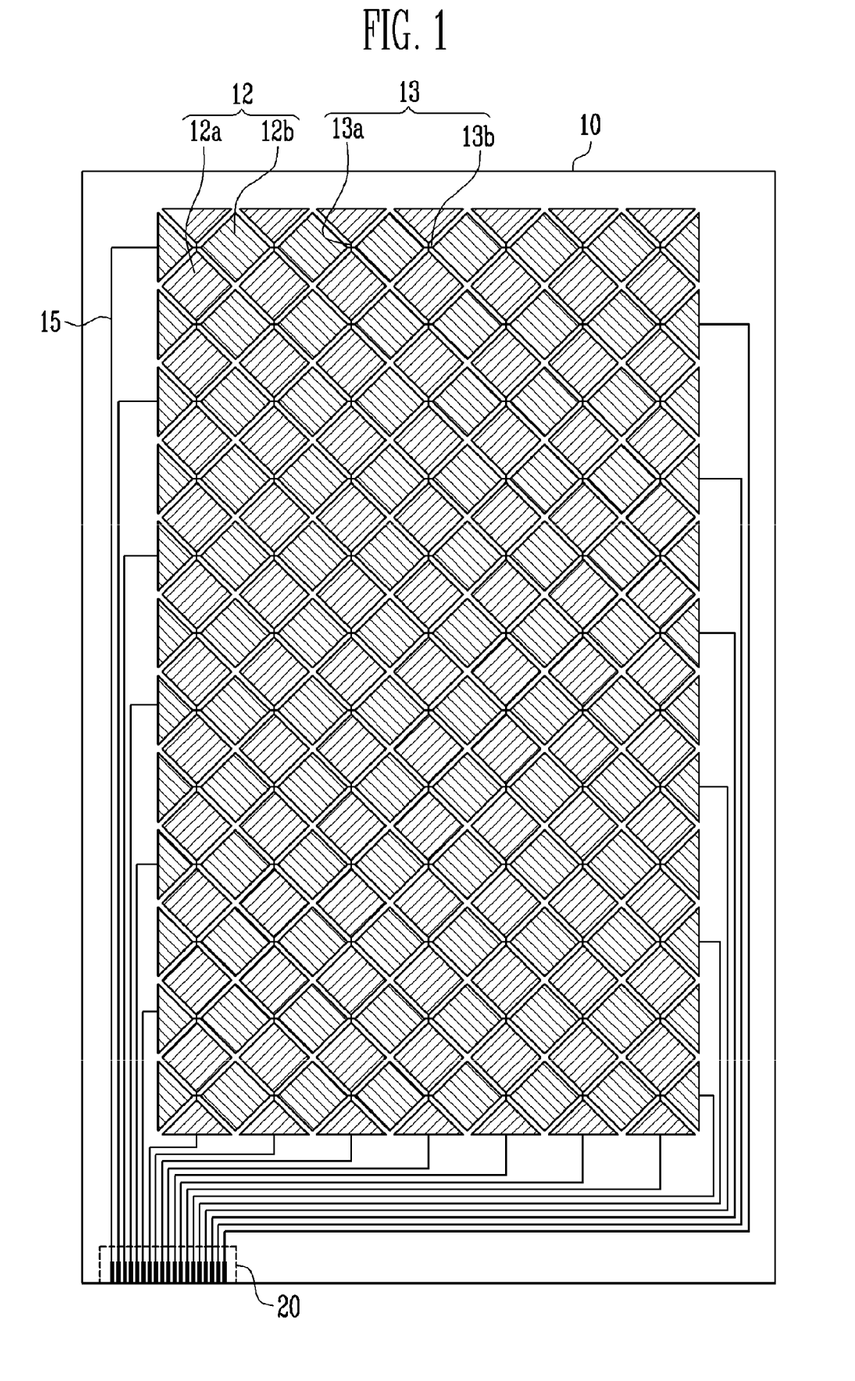
FIG. 1 is a plan view illustrating one example of a touch screen panel according to an aspect of the invention.

FIG. 1 is a plan view illustrating one example of a touch screen panel according to an aspect of the invention. Referring to FIG. 1, the touch screen panel includes a transparent substrate 10, detection cells 12, connection patterns 13, and position detection lines 15. The detection cells 12 and connection patterns 13 formed on an active touch area of one surface of the transparent substrate 10. The position detection lines 15 are formed on an inactive touch area of the outer peripheral portions of the active touch area of the one surface of the transparent substrate 10 and allow the detection cells 12 to be connected to an external driving circuit (not shown) through a pad unit 20. While not required, the touch screen panel can be included in or connected to a computer, a mobile phone, a portable media player, a television, a remote control device or any other device which displays an image to which a user reacts.

The detection cells 12 include a plurality of first detection cells 12a and second detection cells 12b. The first detection cells 12a are formed on the active touch area along a first direction along which they are connected to each other. The second detection cells 12b are formed on the active touch area along a second direction along which they are connected to each other. The second direction crosses (e.g., is perpendicular to) the first direction, although the invention is limited to the first and second directions being perpendicular to each other.

Figure 2A:
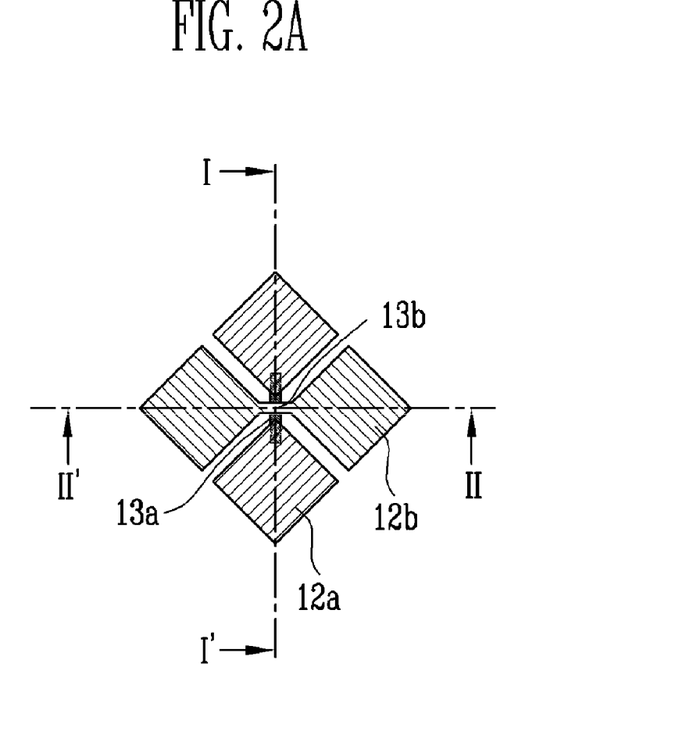
FIGS. 2A and 2B are enlarged views illustrating main elements in one example of detection cells and connection patterns illustrated in FIG. 1 according to an aspect of the invention.
Figure 2B:
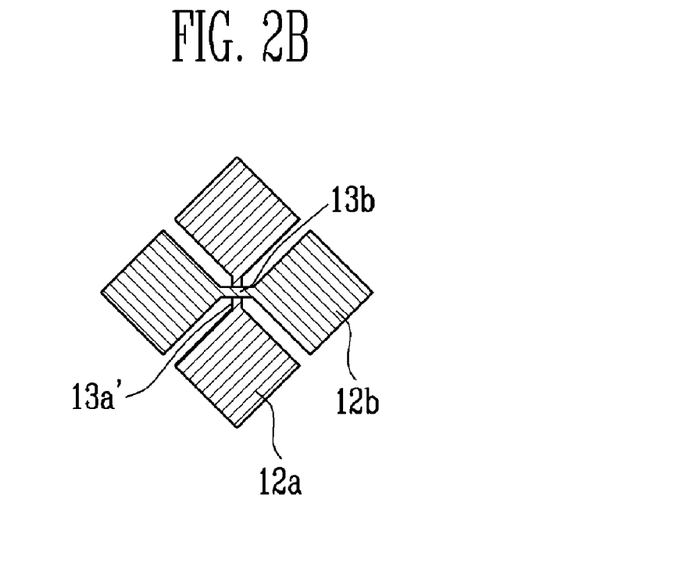

Specifically, FIG. 1 illustrates one example of a capacitive touch screen panel in which the plurality of the first detection cells 12a and the plurality of the second detection cells 12b are alternately distributed and disposed on the active touch area such that they do not overlap each other. As shown in FIGS. 1, 2A and 2B, the first detection cells 12a are disposed along column lines and/or row lines. The first detection cells 12a located at the same column lines or row lines (the same column lines in the embodiment) are connected to each other along the first direction (the row direction in the embodiment) through a plurality of first connection patterns 13a disposed the same column lines or row lines. At this time, the first detection cells 12a are connected to the position detection lines 15 by the lines for which the first detection cells 12a are connected along the first direction.

Furthermore, the second detection cells 12b are disposed along column lines and/or row lines. The second detection cells 12b located at the same column lines or row lines (the same row lines in the embodiment) are connected to each other along the second direction (the column direction in the embodiment) while crossing the first direction through a plurality of second connection patterns 13b disposed the same column lines or row lines. As shown, the second detection cells 12b are connected to the position detection lines 15 by the lines for which the second detection cells 12b are connected along the second direction.

The first detection cells 12a and the second detection cells 12b are transparent with a transparency of at least a predetermined value sufficient to allow light from a display panel (not shown) disposed below the touch screen panel to pass through the first detection cells 12a and the second detection cells 12b. For example, the first detection cells 12a and the second detection cells 12b may be formed of a transparent electrode material such as ITO (Indium Tin Oxide) or IZO (Indium Zinc Oxide).

The connection patterns 13 include the plurality of the first connection patterns 13a and the plurality of the second connection patterns 13b. The first connection patterns 13a are formed along the first direction to connect the first detection cells 12a to each other along the first direction. The second connection patterns 13b are formed along the second direction to connect the second detection cells 12b to each other along the second direction.

The position detection lines 15 are electrically connected to the first detection cells 12a, which are connected to each other along the first direction by the line, and the second detection cells 12b, which are connected to each other along the second direction by the line, and connect the first detection cells 12a and the second detection cells 12b to an external driving circuit (not shown) such as a position detection circuit through the pad unit 20.

Such position detection lines 15 are located in the inactive touch area of the outer peripheral portions of the active touch area for displaying an image, and may be formed of various materials. For example, in addition to the transparent electrode material used for forming the detection cells 12, the position detection lines 15 may be formed of a low resistance material such as molybdenum (Mo), silver (Ag), titanium (Ti), copper (Cu), aluminum (Al) or molybdenum (Mo)/aluminum (Al)/molybdenum (Mo).

The above-described touch screen panel is a capacitive touch screen panel. If a contact object such as a finger of a person or a stylus pen makes contact with the touch screen panel, a change in capacitance due to the contact position is transmitted to the driving circuit (not shown) from the detection cells 12 via the position detection lines 15 and the pad unit 20. Then, the change in the capacitance is converted into an electrical signal by X and Y input processing circuit (not shown) and the like, so that the contact position is understood.

While not required in all aspects, the touch screen panel may further include a driving/shield electrode formed on the other surface facing the one surface on which the first detection cells 12a and the second detection cells 12b are formed. In such a case, the driving/shield electrode may be used as another driving electrode other than the first and second first detection cells 12a and 12b, or may be used as a shield electrode for ensuring stability between the touch screen panel and the display panel disposed below the touch screen panel. Details thereof will be described later.

FIGS. 2A and 2B are enlarged views illustrating main elements in one example of the detection cells 12 and the connection patterns 13 illustrated in FIG. 1. FIG. 2A illustrates one example of the touch screen panel with a one-layer structure in which the first detection cells 12a and the second detection cells 12b are formed on the same layer. FIG. 2B illustrates one example of the touch screen panel with a two-layer structure in which the first detection cells 12a and the second detection cells 12b are formed on different layers.

Referring to FIG. 2A, the first detection cells 12a and the second detection cells 12b are alternately disposed on the same layer in such a manner that the first detection cells 12a are connected to each other along the first direction by the first connection patterns 13a and the second detection cells 12b are connected to each other along the second direction by the second connection patterns 13b. In order to ensure stability (insulation property) between the first connection patterns 13a and the second connection patterns 13b, the first connection patterns 13a and the second connection patterns 13b are located on different layers while interposing an insulation layer (not shown) therebetween.

For example, the first connection patterns 13a are located above or below the layer, on which the first detection cells 12a and the second detection cells 12b are located, and are connected to the first detection cells 12a through contact holes or direct contact. The second connection patterns 13b are located on a layer the same as the layer, on which the first detection cells 12a and the second detection cells 12b are located, and may be integrally patterned with the second detection cells 12b. In such a case, the first detection cells 12a may be separately patterned such that they have independent patterns, and connected to each other along the first direction by the first connection patterns 13a located on the different layer.

Meanwhile, in an aspect the present invention, the first detection cells 12a and the second detection cells 12b are not always located on the same layer. For example, they may also be alternately disposed on different layers. In such an embodiment, as illustrated in FIG. 2B, the first connection patterns 13a and the first detection cells 12a may be located on the same layer and the first connection patterns 13a may be integrally patterned with the first detection cells 12a. The second connection patterns 13b and the second detection cells 12b may be located on the same layer and the second connection patterns 13b may be integrally patterned with the second detection cells 12b.

While not required in all aspects, an insulation layer may be interposed on the area including the active touch area between the layer, on which the first connection patterns 13a and the first detection cells 12a are formed, and the layer on which the second connection patterns 13b and the second detection cells 12b are formed.

Figure 3A:
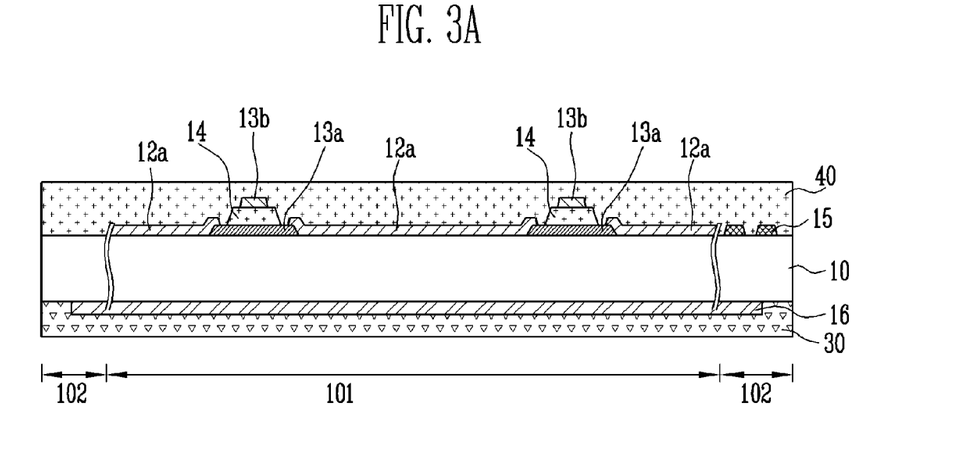
FIGS. 3A and 3B are sectional views illustrating main elements of a touch screen panel according to one embodiment of the present invention.
Figure 3B:
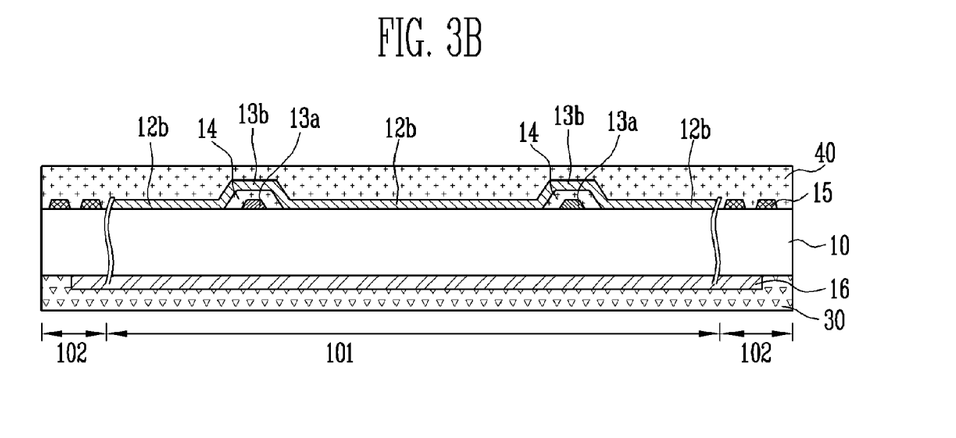

FIGS. 3A and 3B are sectional views illustrating main elements of the touch screen panel according to one embodiment of the present invention, wherein FIG. 3A is the sectional view illustrating the main elements of the touch screen panel, which is taken along line I-I' illustrated in FIG. 2A, and FIG. 3B is the sectional view illustrating the main elements of the touch screen panel, which is taken along line II-II' illustrated in FIG. 2A.

Referring to FIGS. 3A and 3B, the first and second detection cells 12a and 12b and the first and second connection patterns 13a and 13b are formed on an active touch area 101 of one surface (e.g., an upper surface) of the transparent substrate 10. An insulation layer 14 for ensuring stability is interposed between the first connection patterns 13a and the second connection patterns 13b. Furthermore, the position detection lines 15 made of a low resistance material are formed on an inactive touch area 102 of the outer peripheral portions of the active touch area of the one surface of the transparent substrate 10.

The insulation layer 14 is formed to expose one area of the first connection patterns 13*a*, for example, both ends of the first connection patterns 13*a* connected to the first detection cells 12*a*. As the exposed both ends of the first connection patterns 13*a* are connected to the first detection cells 12*a*, the first detection cells 12*a* are connected to each other along the first direction (e.g., the row direction).

The second connection patterns 13*b* are patterned such that they are integrally connected to the second detection cells 12*b* along the second direction (e.g., the column direction) via the upper portion of the insulation layer 14. Thus, the second detection cells 12*b* are connected to each other along the second direction.

Meanwhile, FIGS. 3A and 3B illustrate one example of the sections of the detection cells and the connection patterns provided in the touch screen panel with a one-layer structure as illustrated in FIG. 2A. For the purpose of convenience, FIGS. 3A and 3B illustrate an embodiment in which the insulation layer 14 is locally interposed only in the intersection parts of the first connection patterns 13*a* and the second connection patterns 13*b*.

However, the present invention is not limited thereto. For example, an insulation layer may be formed throughout the active touch area, and detection cells (e.g., the first detection cells 12*a*) located at a different layer may also be electrically connected to connection patterns (e.g., the first connection patterns 13*a*) through contact holes formed through the insulation layer.

Furthermore, FIGS. 3A and 3B illustrate one example in which the first connection patterns 13*a* are located under the insulation layer 14 and the second connection patterns 13*b* are located on the insulation layer 14. However, it goes without saying that the positions of the first connection patterns 13*a* and the second connection patterns 13*b* may also be reversed.

The active touch area 101 is transparent such that a light from a display panel (not shown) disposed below the touch screen panel can pass through the active touch area 101. That is, the first and second detection cells 12*a* and 12*b*, the second connection patterns 13*b*, the insulation layer 14 and the like are formed of a transparent material with a transparency of a predetermined value or more. Herein, the transparency comprehensively includes transparency with a high light transmittance, as well as transparency of 100%.

In this example, the first and second detection cells 12*a* and 12*b* and the second connection patterns 13*b* are formed of a transparent electrode material such as ITO or IZO, and the insulation layer 14 is formed of a transparent insulation material such as silicon oxide ($SiO_2$). Furthermore, the first connection patterns 13*a* may be formed of a transparent electrode material, similarly to the first and second detection cells 12*a* and 12*b* and the second connection patterns 13*b*, or an opaque low resistance metal similarly to the position detection lines 15. The line width, length, thickness and the like of the first connection patterns 13*a* may be adjusted such that the first connection patterns 13*a* is prevented from being visualized.

Meanwhile, a driving/shield electrode 16 is formed on the other surface (e.g., a bottom surface) of the transparent substrate 10. For example, the driving/shield electrode 16 having a thickness of 100 Å to 300 Å and made of a transparent electrode material such as ITO or IZO may be formed on the other surface of the transparent substrate 10.

Such a driving/shield electrode 16 may be used as a separate driving electrode other than the first and second detection cells 12*a* and 12*b* receiving a driving signal of the touch screen panel, or may be connected to a constant voltage source such as a ground power source to be used as a shield electrode for ensuring stability between the touch screen panel and the display panel disposed below the touch screen panel.

For example, in the capacitive touch screen panel, in order to detect a contact position, capacitance between the first detection cells 12*a* and the second detection cells 12*b* may be used or capacitance between the first and second detection cells 12*a* and 12*b* and the driving/shield electrode 16 may be used. Various modifications can be made.

Specifically, in an aspect of the present invention, the driving/shield electrode 16 is formed throughout the other surface of the transparent substrate 10, and both ends of the driving/shield electrode 16 are located at an inner side of the transparent substrate 10 while being spaced apart from the boundary line of the transparent substrate 10 by a predetermined interval. That is, the driving/shield electrode 16 is formed throughout the other surface of the transparent substrate 10 except for the outer peripheral portions of the other surface of the transparent substrate 10.

For example, the driving/shield electrode 16 may be formed such that the end of the driving/shield electrode 16 is located in the inactive touch area between the end of the transparent substrate 10 and the active touch area 101. However, the invention is not limited thereto.

A first insulation layer 30 is formed on the driving/shield electrode 16 to protect the driving/shield electrode 16 and such that the electrode 16 is between the first insulation layer 30 and the transparent substrate 10. The first insulation layer 30 is formed throughout the other surface of the transparent substrate 10, on which the driving/shield electrode 16 is formed, to cover the driving/shield electrode 16. Specifically, the first insulation layer 30 is formed to cover the entire exposed surface of the driving/shield electrode 16, inclusive of the sides of the driving/shield electrode 16. Consequently, moisture and the like is prevented from being effectively infiltrated into the driving/shield electrode 16 from an outside, so that the stability of the driving/shield electrode 16 can be ensured.

Meanwhile, a second insulation layer 40 is formed on the first detection cells 12*a* and the second detection cells 12*b* to cover the first detection cells 12*a* and the second detection cells 12*b*, thereby protecting the first detection cells 12*a* and the second detection cells 12*b*. For example and while not required in all aspects, the second insulation layer 40 may be formed throughout the one surface of the transparent substrate 10, on which the first detection cells 12*a* and the second detection cells 12*b* are formed, to cover the first detection cells 12*a* and the second detection cells 12*b*. Thus, the detections cells 12 are between the second insulation layer 40 and the transparent substrate 10.

According to the shown aspect of the present invention as described above, both ends of the driving/shield electrode 16 formed throughout one surface of the touch screen panel are located at the inner side of the transparent substrate 10 while being spaced apart from the boundary line of the transparent substrate 10 by the predetermined interval, and the first insulation layer 30 covers the entire exposed surface of the driving/shield electrode 16, inclusive of the sides of the driving/shield electrode 16, so that the stability of the driving/shield electrode 16 can be ensured and the reliability of the touch screen panel can be improved.

FIGS. 4A to 4D are plan views sequentially illustrating a method for forming the driving/shield electrode 16 of the touch screen panel illustrated in FIGS. 3A and 3B, and FIGS. 5A and 5B are sectional views illustrating main elements in one example of patterning the driving/shield electrode 16 illustrated in FIGS. 3A and 3B. For the purpose of convenience, FIGS. 4A to 4D and FIGS. 5A and 5B illustrate only the other surface of the transparent substrate 10 on which the driving/shield electrode 16 is formed.

Figure 4A:
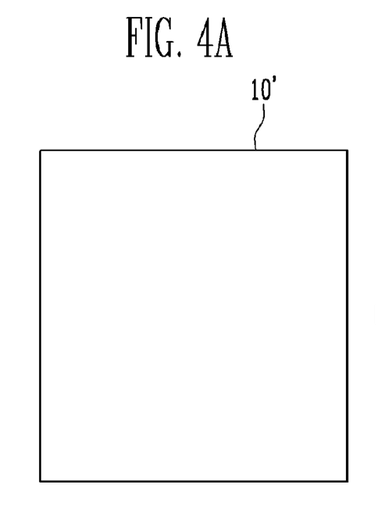
FIGS. 4A to 4D are plan views sequentially illustrating a method for forming a driving/shield electrode of a touch screen panel illustrated in FIGS. 3A and 3B according to an aspect of the invention.

First, as illustrated in FIG. 4A, a transparent mother substrate 10' for forming a plurality of touch screen panels at one time is prepared. The plurality of the first detection cells 12a connected to each other along the first direction as illustrated in FIG. 1, the plurality of the second detection cells 12b connected to each other along the second direction among the first detection cells 12a, the position detection lines 15 connected to the first detection cells 12a and the second detection cells 12b, the second insulation layer 40 and the like are formed on the areas of the touch screen panels of one surface of the mother substrate 10'.

Figure 4B:
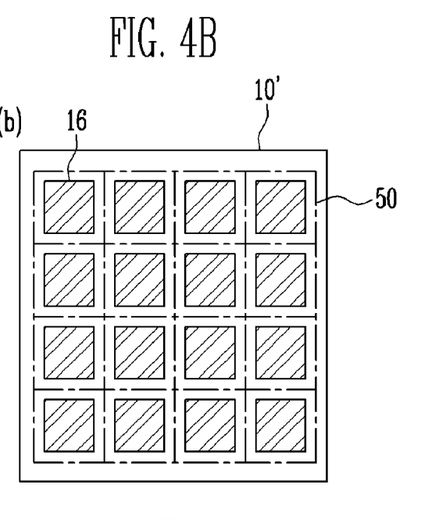

As illustrated in FIG. 4B, the driving/shield electrodes 16 are formed throughout the areas of the touch screen panels of the other surface of the mother substrate 10'. At this time, the driving/shield electrodes 16 are patterned such that the ends of the driving/shield electrodes 16 are located at the inner sides of the areas of the touch screen panels while being spaced apart from a scribing line 50 for separating the touch screen panels by a predetermined interval, and the driving/shield electrodes 16 among adjacent touch screen panels are separated from each other.

Figure 5A:
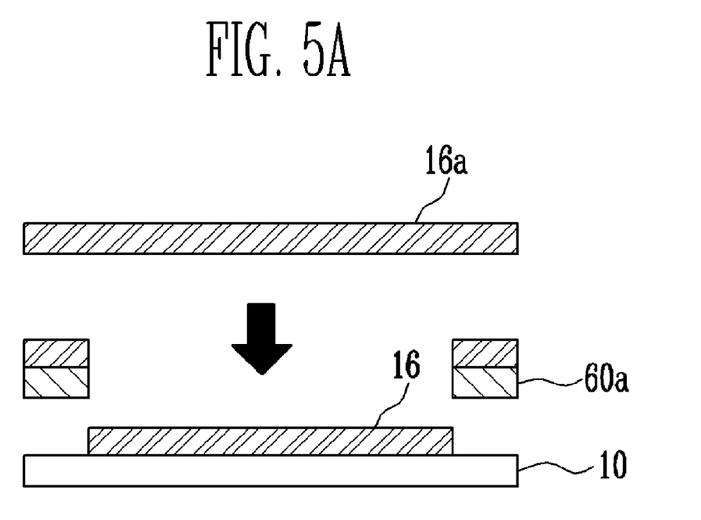
FIGS. 5A and 5B are sectional views illustrating main elements in one example of patterning a driving/shield electrode illustrated in FIGS. 3A and 3B according to an aspect of the invention.
Figure 5B:
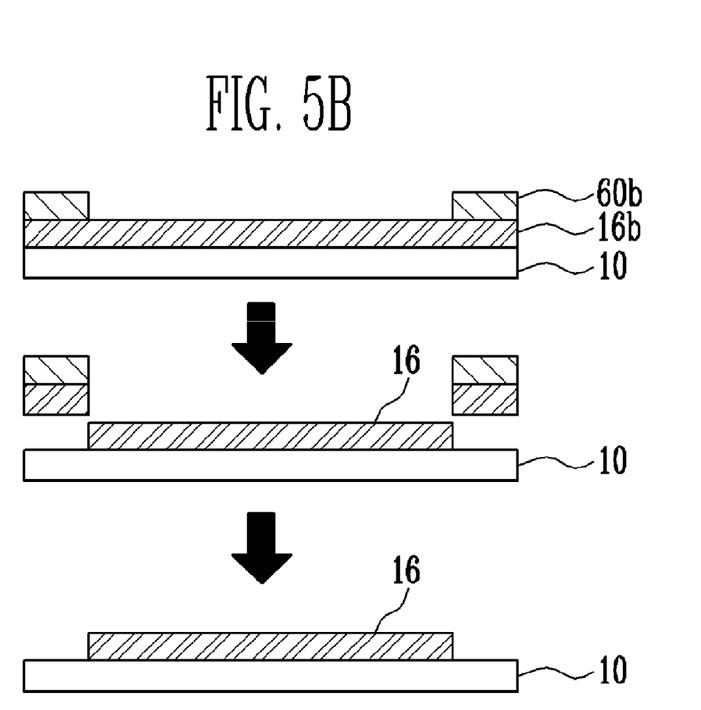

To this end, as illustrated in FIG. 5A, in the step of partially forming a layer in the areas of the touch screen panels of the other surface of the transparent mother substrate 10' by using a transparent electrode material 16a, the driving/shield electrodes 16 can be patterned through masks 60a (for the purpose of convenience, FIGS. 5A and 5B illustrate only the section of one touch screen panel on which the driving/shield electrode 16 is formed).

As illustrated in FIG. 5B, a transparent electrode layer 16b is formed by forming a layer throughout the other surface of the mother substrate 10 by using a transparent electrode material, and then the driving/shield electrodes 16 can be patterned by partially removing a transparent electrode material located in a predetermined distance from a boundary portion (i.e., a scribing line) of the areas of the touch screen panels through wet etching using photoresist 60b and the like or other etching processes.

At this time, in the respective areas of the touch screen panels, the ends of the driving/shield electrodes 16 may be located in an inactive touch area between the scribing line 50 and an active touch area.

Figure 4C:
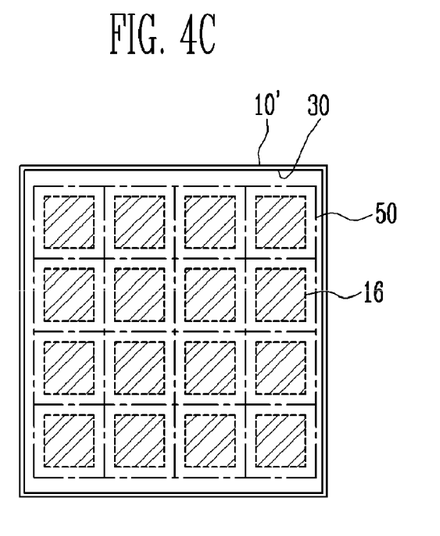

As illustrated in FIG. 4C, the first insulation layer 30, which covers the entire exposed surface of the driving/shield electrodes 16 inclusive of the sides of the driving/shield electrodes 16 formed on the respective areas of the touch screen panels, is formed throughout the other surface of the mother substrate 10'.

Meanwhile, for the purpose of convenience, in FIGS. 4A to 4D, after the first and second detection cells 12a, 12b and the position detection lines 15 are formed on the one surface of the mother substrate 10', the driving/shield electrodes 16 are formed on the other surface of the mother substrate 10'. However, their formation sequence may be changed. For example, after the driving/shield electrodes 16 are formed, the first and second detection cells 12a, 12b, the position detection lines 15 and the like may be formed.

Figure 4D:
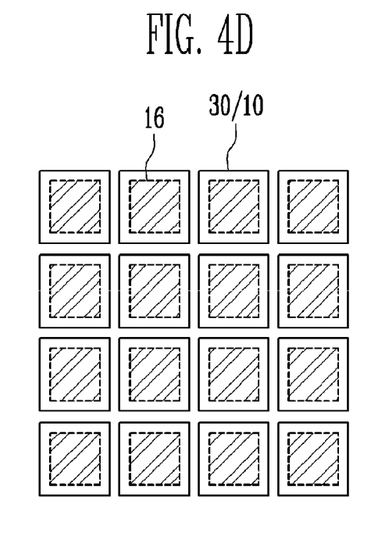

As the mother substrate 10' is cut along the scribing line 50, the touch screen panels are separated from each other as illustrated in FIG. 4D.

Consequently, the driving/shield electrodes 16 are safely covered by the first insulation layer 30 even after the scribing process is completed, so that moisture and the like can be prevented from being infiltrated into the driving/shield electrodes 16 from an outside.

Figure 6A:
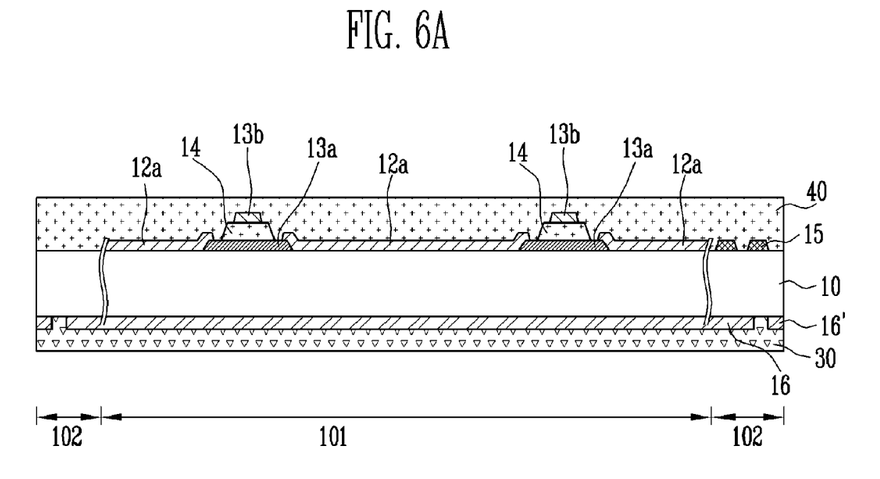
FIGS. 6A and 6B are sectional views illustrating main elements of a touch screen panel according to an embodiment of the present invention.
Figure 6B:
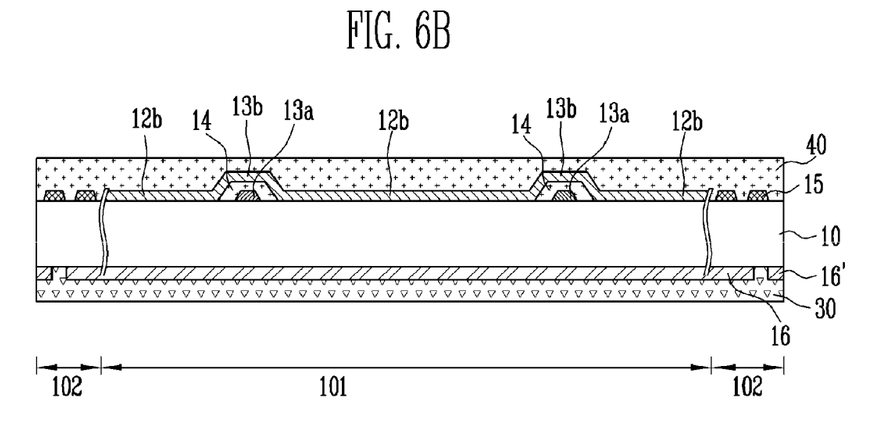
Figure 7:
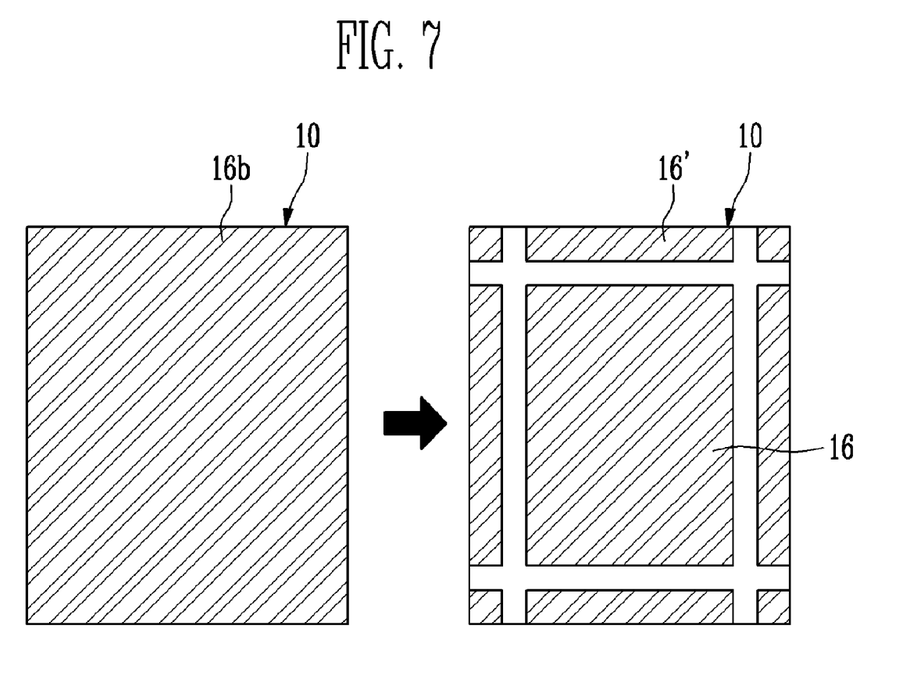
FIG. 7 is a plan view illustrating one example of patterning a driving/shield electrode illustrated in FIGS. 6A and 6B according to an aspect of the present invention.

FIGS. 6A and 6B are sectional views illustrating main elements of a touch screen panel according to another embodiment of the present invention, and FIG. 7 is a plan view illustrating one example of patterning a driving/shield electrode 16' illustrated in FIGS. 6A and 6B. For the purpose of convenience, when describing FIGS. 6A and 6B and FIG. 7, the same reference numerals are used to designate like elements as shown in the embodiment illustrated in FIGS. 3A and 3B, and details thereof will be omitted.

First, referring to FIGS. 6A and 6B, the touch screen panel according to another embodiment further includes dummy patterns 16'. The dummy patterns 16' and the driving/shield electrode 16 are formed on the same layer and formed of the same material. Furthermore, the dummy patterns 16' are formed at the outer peripheral portion of the other surface of the transparent substrate 10.

Such dummy patterns 16' can be simultaneously formed in the step of forming the driving/shield electrode 16. For example, as illustrated in FIG. 7, after the transparent electrode layer 16b is formed using a transparent electrode material throughout the mother substrate or the transparent substrate 10, the transparent electrode layer 16b may be divided into the driving/shield electrode 16, which overlaps the active touch area 101 including the first and second detection cells 12a and 12b, and the outer dummy pattern 16', which is spaced apart from the driving/shield electrode 16, through a laser cutting process, a grinding process, a polishing process and the like.

At this time, the process for separating the driving/shield electrode 16 from the dummy pattern 16' may be performed on the mother substrate before the scribing process, or on the respective touch screen panels after the scribing process.

However, the present invention is not limited thereto. For example, preferably in another aspect, an area, by which the driving/shield electrode 16 is separated from the dummy pattern 16', is located at the inactive touch area between the end (the scribing line) of the transparent substrate 10 including the respective touch screen panels and the active touch area.

In the touch screen panels according to another embodiment of the present invention as described above, even if moisture and the like is infiltrated into an exposed side of the dummy pattern 16', the driving/shield electrode 16 can maintain stability because the driving/shield electrode 16 is spaced apart from the dummy pattern 16'.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:
1. A touch screen panel comprising:
a transparent substrate having one surface with an active touch area and an other surface;
first detection cells and second detection cells alternately disposed on the active touch area such that the first detection cells are connected to each other along a first direction and the second detection cells are connected to each other along a second direction other than the first direction;

a driving/shield electrode formed on the other surface such that ends of the driving/shield electrode are located at an inner side of the transparent substrate while being spaced apart from a boundary line of the transparent substrate by a predetermined interval; and a first insulation layer formed on the other surface of the transparent substrate to cover an exposed surface of the driving/shield electrode, inclusive of the ends of the driving/shield electrode.

2. The touch screen panel as claimed in claim 1, wherein the one surface having the first detection cells and the second detection cells is an upper surface of the transparent substrate, and the other surface having the driving/shield electrode and the first insulation layer is a lower surface of the transparent substrate.

3. The touch screen panel as claimed in claim 1, further comprising a dummy pattern formed at a peripheral portion of the other surface of the transparent substrate while being spaced apart from the driving/shield electrode, the dummy pattern and the driving/shield electrode being formed of a same material and formed on a same layer.

4. The touch screen panel as claimed in claim 1, further comprising a second insulation layer which is formed on the one surface to cover the first detection cells and the second detection cells.

5. The touch screen panel as claimed in claim 1, wherein the first detection cells, the second detection cells, and the driving/shield electrode are formed of a transparent electrode material.

6. A method for fabricating a touch screen panel, the method comprising:

forming a plurality of first detection cells and a plurality of second detection cells on respective areas of touch screen panels of one surface of a mother substrate such that the first detection cells are connected to each other along a first direction and the second detection cells are connected to each other along a second direction other than the first direction;

patterning driving/shield electrodes throughout respective areas of the touch screen panels of an other surface of the mother substrate such that ends of each of the driving/shield electrodes are located at inner sides of the respective areas of the touch screen panels while being spaced apart by a predetermined interval from a scribing line for separating the touch screen panels and for separating the driving/shield electrodes of adjacent ones of the touch screen panels from each other;

forming a first insulation layer on the other surface to cover an exposed surface of the driving/shield electrodes and the ends of the driving/shield electrodes; and separating the touch screen panels from each other by cutting the mother substrate along the scribing line.

7. The method as claimed in claim 6, wherein the patterning of the driving/shield electrodes comprises partially forming a layer on the respective areas by passing a transparent electrode material through masks.

8. The method as claimed in claim 6, wherein the patterning of the driving/shield electrodes comprises:

forming a layer on the other surface using a transparent electrode material; and removing portions of the formed transparent electrode material located at boundary portions of the respective areas of the touch screen panels through an etching process.

9. The method as claimed in claim 6, wherein the patterning of the driving/shield electrodes comprises:

forming a layer on the other surface using a transparent electrode material; and dividing the transparent electrode material formed on the respective areas of the touch screen panels into a driving/shield electrode, which overlaps the first detection cells and the second detection cells, and an outer dummy pattern, which is located around the scribing line while being spaced apart from the driving/shield electrode, through a laser cutting process, a grinding process or a polishing process.

* * * * *

(12) SUPPLEMENTAL EXAMINATION CERTIFICATE

United States Patent  (10) Number: US 8,405,635 F1
Park et al. (45) Certificate Issued: Jun. 26, 2015

Control No.: 96/000,092  Filing Date: May 12, 2015
Primary Examiner: K. M. Reichle

No substantial new question of patentability is raised in the request for supplemental examination. See the Reasons for Substantial New Question of Patentability Determination in the file of this proceeding.

(56) Items of Information

FOREIGN PATENT DOCUMENTS

KR          10-2010-0084251     7/26/2010

*This is a Corrected Supplemental Examination Certificate. The Supplemental Examination Certificate issued June 24, 2015 had omitted a kind code.